US010783450B2

(12) United States Patent
Vlassis et al.

(10) Patent No.: US 10,783,450 B2
(45) Date of Patent: Sep. 22, 2020

(54) LEARNING USER PREFERENCES USING SEQUENTIAL USER BEHAVIOR DATA TO PREDICT USER BEHAVIOR AND PROVIDE RECOMMENDATIONS

(71) Applicant: Adobe Inc., San Jose, CA (US)

(72) Inventors: Nikolaos Vlassis, San Jose, CA (US); Georgios Theocharous, San Jose, CA (US); Mandana Hamidi Haines, Corvallis, OR (US)

(73) Assignee: ADOBE INC., San Jose, CA (US)

( * ) Notice: Subject to any disclaimer, the term of this patent is extended or adjusted under 35 U.S.C. 154(b) by 987 days.

(21) Appl. No.: 15/348,747

(22) Filed: Nov. 10, 2016

(65) Prior Publication Data
US 2018/0129971 A1 May 10, 2018

(51) Int. Cl.
*G06N 20/00* (2019.01)
*G06Q 30/02* (2012.01)
*G06N 7/00* (2006.01)

(52) U.S. Cl.
CPC .............. *G06N 20/00* (2019.01); *G06N 7/005* (2013.01); *G06Q 30/0255* (2013.01)

(58) Field of Classification Search
CPC ............... G06N 20/10; G06Q 30/0255; G06Q 30/0251–0271
See application file for complete search history.

(56) References Cited

U.S. PATENT DOCUMENTS

| 7,882,056 | B2* | 2/2011 | Begole | G06Q 30/02 706/45 |
| 8,510,253 | B2* | 8/2013 | Anderson | G06Q 30/02 706/52 |
| 9,183,497 | B2* | 11/2015 | Zhang | G06N 7/005 |
| 2019/0080367 | A1* | 3/2019 | Agarwal | G06Q 30/0277 |

OTHER PUBLICATIONS

Ricci, Francesco et al.; Recommender Systems Handbook; 2010; Springer; pp. i-842. (Year: 2010).*

(Continued)

*Primary Examiner* — Stanley K. Hill
(74) *Attorney, Agent, or Firm* — Kilpatrick Townsend & Stockton LLP (57) ABSTRACT

Certain embodiments involve learning user preferences and predicting user behavior based on sequential user behavior data. For example, a system obtains data about a sequence of prior actions taken by multiple users. The system determines a similarity between a prior action taken by the various users and groups the various users into groups or clusters based at least in part on the similarity. The system trains a machine-learning algorithm such that the machine-learning algorithm can be used to predict a subsequent action of a user among the various users based on the various clusters. The system further obtains data about a current action of a new user and determines which of the clusters to associate with the new user based on the new user's current action. The system determines an action to be recommended to the new user based on the cluster associated with the new user. The action can include a series or sequence of actions (Continued)

to be taken by the new user. The system further provides the series or sequence of actions or an action of the series or sequence to the new user.

20 Claims, 4 Drawing Sheets

(56) References Cited

OTHER PUBLICATIONS

Koren, Yehuda; Factor in the Neighbors: Scalable and Accurate Collaborative Filtering; 2010; ACM Transactions on Knowledge Discovery from Data, vol. 4, No. 1, Article 1; pp. 1:1-1:24. (Year: 2010).*
Yehuda Koren et al. "Matrix Factorization Techniques Recommender Systems." IEEE Computer Society (2009), 8 pages.
Aditya Gopalan et al. "Thompson Sampling for Learning Parameterized Markov Decision Processes." JMLR Workshop and Conference Proceedings; vol. 40 (2015), 38 pages.
Pascal Poupart et al. "An analytic Solution to Discrete Bayesian Reinforcement Learning." Proceedings of the 23rd International Conference on Machine Learning;2006, 8 pages.
Wai-Ki Ching et al."Markov Chains: Models, Algorithms and Applications" ISBN-13: 978-0387-29337-0 2006, 211 pages.
Volodymyr Melnykov "Model-based biclustering of clickstream data." Computational Statistics and Data Analysis 93 (2016), 45 pages.

\* cited by examiner

LEARNING USER PREFERENCES USING SEQUENTIAL USER BEHAVIOR DATA TO PREDICT USER BEHAVIOR AND PROVIDE RECOMMENDATIONS

TECHNICAL FIELD

This disclosure generally relates to machine-learning and more specifically relates to training and applying machine-learning to learn user preferences using sequential user behavior data, which can be used to accurately predict user behavior and improve the recommendation of various actions to a user in various applications.

BACKGROUND

Certain computing applications use various methods and techniques to recommend actions to a user (e.g., recommend an offer to be provided to a user, recommend a location to a user, or recommend sports, news, weather, etc. to a user). The computing applications recommend actions to the user based on various data about the user including, for example, user preference or user location. These recommendations allow online content of interest to the user to be automatically provided to the user, thereby providing a more rewarding, customized user experience.

Existing recommendation solutions involve disadvantages. For instance, computing applications that recommend actions to users often use sparse data (e.g., an incomplete data set) or data that may not account for sequential user behavior (e.g., a sequence of locations visited by the user or a sequence of offers accepted or selected by a user). It is challenging to predict user behavior and accurately determine recommended actions to be provided to the user using such sparse data. For example, a computing application using sparse data can inaccurately learn user preferences, which will cause the computing application to inaccurately predict recommendations to be provided to the user.

Thus, existing machine-learning systems present disadvantages such as, but not limited to, those discussed above. For these and other reasons, improved techniques for learning user preferences and predicting subsequent user behavior are therefore desirable.

SUMMARY

Various embodiments of the present disclosure provide systems and methods for learning user preferences and predicting user behavior based on sequential user behavior data, which can be used to improve the recommendation of various actions to a user in various applications. In one example, a method for learning user preferences for accurately predicting user behavior based on sequential user behavior data includes obtaining, by a processor, a data set. The data set can indicate a sequence of prior actions taken by a plurality of users. The method further includes grouping, by the processor, the plurality of users to form a plurality of user clusters based at least in part on a similarity between a prior action taken by the plurality of users. The method further includes using, by the processor, the plurality of user clusters to train a machine-learning algorithm, the machine-learning algorithm usable to predict a subsequent action of a user of the plurality of users. The method also includes obtaining, by the processor, user data indicating a current action of a subsequent user. The method also includes determining, by the processor, a user cluster of the plurality of user clusters to associate with the subsequent user based on the current action using the machine-learning algorithm. The method further includes determining, by the processor, a recommended sequence of actions to be provided to the subsequent user based on the user cluster and the current action using the machine-learning algorithm.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Various embodiments of the present disclosure involve learning user preferences and predicting user behavior based on sequential user behavior data. As described above, existing systems for recommending actions to a user use incomplete data sets or data that may not account for sequential user behavior, which can cause the systems to inaccurately learn the user's preferences and inaccurately predict recommendations to be provided to the user. Certain embodiments address these issues by learning user preferences through sequential user behavior data (e.g., data indicating a series or sequence of actions taken by a user), which can allow user behavior to be accurately predicted and improve the recommendation of various actions to a user in various applications.

For instance, a recommendation system, which includes one or more computing devices, obtains data about a sequence of prior actions taken by multiple users (e.g., data about a trajectory of the users, such as, for example, a sequence of locations visited by the various users, a series of offers accepted by the various users, a series of offers made to the various users, a series of purchases made by the various users, etc.). The recommendation system further determines a similarity between a prior action taken by the various users and groups the various users into multiple personas, groups, or clusters based at least in part on the similarity. The recommendation system trains a machine-learning algorithm such that the machine-learning algorithm can be used to predict a subsequent action of a user among the various users based on the various clusters, as described in further detail in the examples below. Examples of the machine-learning algorithm include a probabilistic suffix tree, a neural network, etc. The recommendation system further obtains data about a current action of a new user and determines which of the clusters to associate with the new user based on the new user's current action. The recommendation system further determines an action to be recommended to the new user based on the cluster associated with the new user. The action can include a series or sequence of actions to be taken by the new user. The recommendation system further provides the series or sequence of actions or an action of the series or sequence to the new user.

In some embodiments, the recommendation system obtains data indicating a series or sequence of locations or points-of-interest visited by various users. The recommendation system groups the users into various clusters using various methods and techniques such as, for example, grouping the users into the various clusters based on a similarity between the locations or points-of-interest visited by the users. As an example, the recommendation system compares a first sequence of locations visited by a first user and a second sequence of locations visited by a second user and determines a similarity between the first sequence and second sequence based on the comparison. The recommendation system groups the first user and the second user into a first cluster based on the similarity between the first sequence and second sequence (e.g., based on the first and second sequences being substantially similar). The recommendation system also compares a third sequence of locations visited by a third user and a fourth sequence of locations visited by a fourth user and determines a similarity between the third sequence and the fourth sequence. The recommendation system groups the third user and the fourth user into a second cluster based on the similarity between the third sequence and the fourth sequence (e.g., based on the third and fourth sequences being substantially similar).

In this example, the recommendation system trains a machine-learning algorithm to predict a subsequent location or point-of-interest that the first user or the second user will visit based on the first cluster or predict a subsequent location or point-of-interest that the third or fourth user will visit based on the second cluster. In some embodiments, the recommendation system trains the machine-learning algorithm to predict the subsequent location or point-of-interest that the first, second, third, or fourth user will visit using various methods and techniques. In some aspects, the machine-learning algorithm uses a Partially Observable Markov Decision Process ("POMDP") to predict the subsequent location or point-of-interest that the first, second, third, or fourth user will visit. Examples of the machine-learning algorithm include a probabilistic suffix tree, a neural network, etc. In some aspects, the POMDP process can allow for modeling of sequential processes (e.g., a series of locations or points-of-interest that the first, second, third, or fourth user will visit). For example, the recommendation system trains the machine-learning algorithm using a POMDP in which the first or second user's current state (e.g., current location or point-of-interest) are mapped to a potential action (e.g., going to a next location or point-of-interest). Using the POMDP, the machine-learning algorithm determines a probability distribution of a future state (e.g., a probability distribution of the first user or the second user subsequently visiting a particular location or point-of-interest). Based on the probability distribution, the machine-learning algorithm is trained to predict a subsequent location or point-of-interest that the first user or the second user will visit. As an example, the machine-learning algorithm predicts a particular subsequent location or point-of-interest based on the particular subsequent location or point-of-interest having the highest probability among various locations or points-of-interest (e.g., having the highest probability that the first user or the second user will subsequently visit the particular location or point-of-interest).

The recommendation system then uses the machine-learning algorithm to provide a recommended action to be provided to a new user. For example, the recommendation system obtains data indicating a current location or point-of-interest of the new user and the recommendation system determines a cluster (e.g., the first cluster or the second cluster) to associate with the new user based on the current location or point-of-interest of the new user. For example, the recommendation system associates the new user with the first cluster (e.g., includes the new user in the first cluster) if the current location of the new user corresponds to a location in the first sequence of locations or a location in the second sequence of locations (e.g., if the current location of the new user is substantially similar to a location in the first or second sequence of locations). The recommendation system then determines a recommended sequence of locations or points-of-interest to be provided to the new user based on the first cluster. In some examples, the recommendation system uses the machine-learning algorithm to determine the recommended sequence of locations or points-of-interest using the probability distribution developed using the POMDP described above. For example, the recommendation system uses the machine-learning algorithm to determine a sequence of locations or points-of-interest having a highest probability of being visited by the new user from among various sequences of locations or points-of-interest.

In some examples, the recommendation system iteratively learns preferences of the new user to determine additional recommendations to be provided to the new user. As an example, the recommendation system obtains data about a subsequent location of the new user and compares the subsequent location to the recommended sequence of locations provided to the new user. The recommendation system determines whether the subsequent location corresponds to a location in the recommended sequence of locations based on the comparison. The recommendation system then determines a cluster (e.g., the first cluster or the second cluster) to associate with the new user based on the subsequent location of the new user and determines another recommended sequence of locations or points-of-interest to be provided to the new user based on the cluster. For example, if the new user is associated with the first cluster and the subsequent location corresponds to a location in the first or second sequence of locations, the recommendation system determines another recommended sequence of locations to be provided to the new user based on the first cluster or may not provide another recommendation. In another example, if the new user is associated with the first cluster and the subsequent location of the new user does not correspond to a location in the first or second sequence of locations, the recommendation system compares the subsequent location to the third or fourth sequence of locations and associates the new user with the second cluster. The recommendation system can then determine another recommended sequence of locations to be provided to the new user based on the second cluster. In this manner, the recommendation system trains a machine-learning algorithm and uses the machine-learning algorithm to iteratively learn user preferences using sequential user behavior data to accurately predict subsequent user behavior and improve recommendation of various actions to a user.

In some examples, a user can access the recommendation system described above via an online service. For example, the online service can include one or more computing systems configured by program code to implement the operations describe above (e.g., implement the operations performed by the recommendation system) and the user can access the online service using a client device (e.g., a mobile telephone) via a data network.

As used herein, the term "state" is used to refer to any data associated with a user. Examples of data associated with a user include, but are not limited to, a location of a user, a history of locations of the user, a series or sequence of locations of the user, demographic data about the user, transaction data associated with the user, or any other data associated with the user.

As used herein, the term "trajectory" is used to refer to any data indicating sequence, series, or group of states. An example of a trajectory includes, but is not limited to, a series of locations of a user.

As used herein, the term "persona" is used to refer to any group or cluster of states. Examples of groups or clusters of states include states that are sufficiently similar.

As used herein, the term "online service" is used to refer to one or more computing resources, including computing systems that may be configured for distributed processing operations, that provide one or more applications accessible via a data network. The collection of computing resources can be represented as a single service. In some embodiments, an online service provides a digital hub for browsing, creating, sharing, and otherwise using electronic content using one or more applications provided via the online service.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
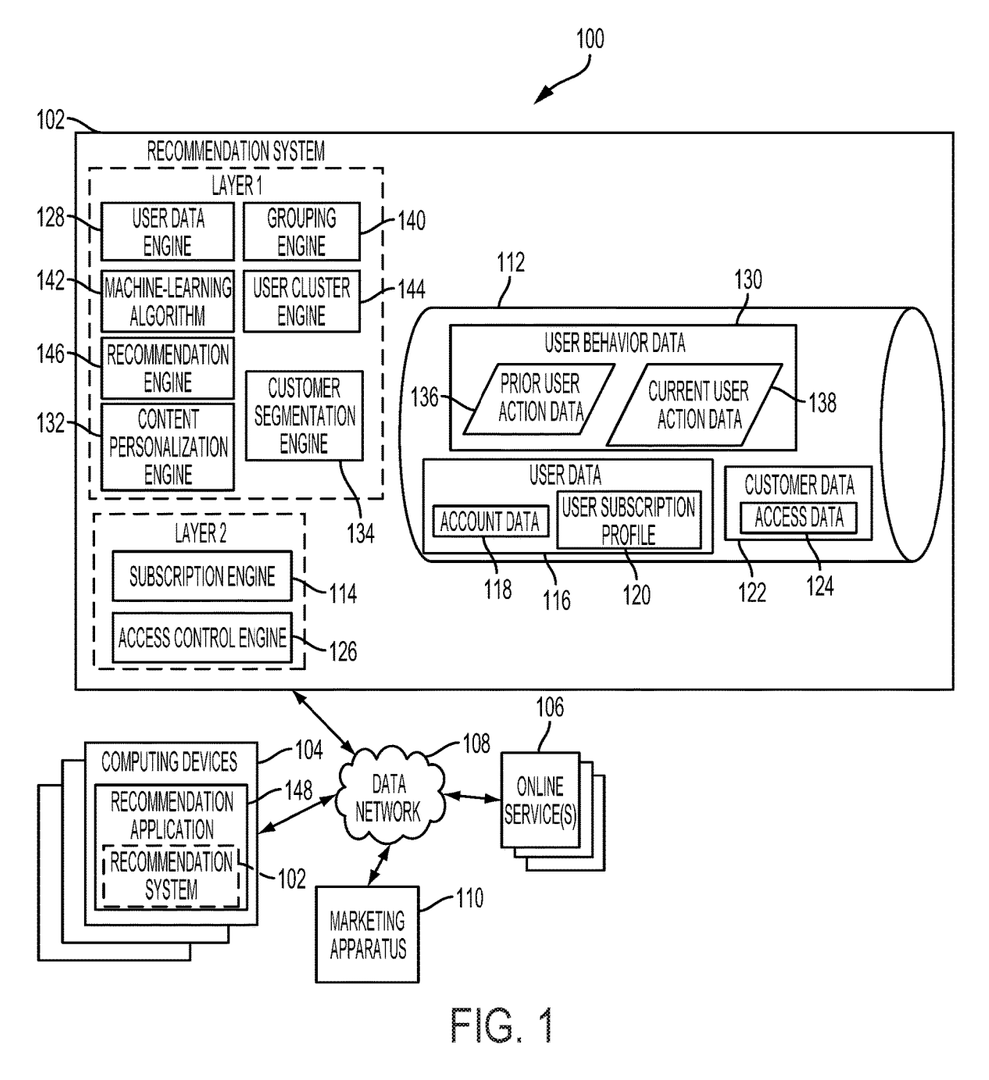
FIG. 1 is an example of a computing environment in which a recommendation system learns user preferences and predicts user behavior based on sequential user behavior data to improve recommendation of various actions to a user, according to certain embodiments.

FIG. 1 is an example of a computing environment 100 in which a recommendation system 102 learns user preferences and predicts user behavior based on sequential user behavior data to improve recommendation of various actions to a user, according to certain embodiments. The computing environment 100 includes the recommendation system 102 (which can be included in or otherwise used by a marketing apparatus), one or more computing devices 104, and one or more online services 106. The recommendation system 102, computing devices 104, and online services 106 are communicatively coupled via one or more data networks 108 (e.g., the Internet, one or more local area networks ("LAN"), wired area networks, one or more wide area networks, or some combination thereof).

Each of the computing devices 104 is connected (or otherwise communicatively coupled) to a marketing apparatus 110 via the data network 108. A user of one of the computing devices 104 uses various products, applications, or services supported by the marketing apparatus 110 via the data network 108. Examples of the users include, but are not limited to, marketing professionals who use digital tools to generate, edit, track, or manage online content, or to manage online marketing processes, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the recommendation system 102.

Digital experience, as described herein, includes experience that can be consumed through an electronic device. Examples of the digital experience include, but are not limited to, content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

The recommendation system 102 includes one or more devices that provide and execute one or more engines for providing one or more digital experiences to a user. The recommendation system 102 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like.

The recommendation system 102 also includes a data storage unit 112. The data storage unit 112 can be implemented as one or more databases or one or more data servers. The data storage unit 112 includes data that can be used by the engines of the recommendation system 102.

In some embodiments, the recommendation system 102 can be divided into two layers of engines. For example, Layer 1 includes core engines that provide workflows to the user and Layer 2 includes shared engines that are shared among the core engines. Any core engine can call any of the shared engines for execution of a corresponding task. In additional or alternative embodiments, the recommendation system 102 does not have layers, and each core engine can have an instance of the shared engines. In various embodiments, each core engine can access the data storage unit 112 directly or through the shared engines.

In some embodiments, the user of the computing device 104 visits a webpage or an application store to explore applications supported by the recommendation system 102. The recommendation system 102 provides the applications as a software as a service ("SaaS"), or as a standalone application that can be installed on one or more of the computing devices 104, or as a combination.

In some embodiments, the user creates an account with the recommendation system 102 by providing user details and also by creating login details. In additional or alternative embodiments, the recommendation system 102 can automatically create login details for the user in response to receipt of the user details. The user can also contact the entity offering the services of the recommendation system 102 and can get the account created through the entity. The user details are received by a subscription engine 114 and stored as user data 116 in the data storage unit 112. In some embodiments, the user data 116 further includes account data 118, under which the user details are stored. In some embodiments, the user can also be prompted to install an application manager. The application manager enables the user to manage installation of various applications supported by the recommendation system 102.

In some embodiments, a user can opt for a trial account or a subscription to one or more engines of the recommendation system 102. Based on the trial account or the subscription details of the user, a user subscription profile 120 is generated by the subscription engine 114 and stored. The user subscription profile 120 is stored in the data storage unit 112 and indicates entitlement of the user to various products or services. The user subscription profile 120 also indicates a type of subscription, e.g., a free trial, a premium subscription, or a regular subscription.

Each engine of the recommendation system 102 also stores customer data 122 for the user in the data storage unit 112. The user or the entity of the user can have one or more customers, including potential customers, and hence, the one or more engines of the recommendation system 102 store the customer data 122. The customer data 122 can be shared across these engines or can be specific to each engine. In some embodiments, access data 124 is a part of the customer data 122. The access to the customer data 122 is controlled by an access control engine 126, which can be shared across the engines of the recommendation system 102 or each engine can have one instance of the access control engine 126. The access control engine 126 determines if the user has access to a particular customer data 122 based on the subscription of the user and access rights of the user.

A user of the recommendation system 102 can enable tracking of content while creating content or at any point. Various methods of tracking can be used. For example, tracking code can be embedded into the content for tracking and sending tracked data to the user data engine 128. The user data engine 128 tracks the data and stores the tracked data as user behavior data 130 or other data. The user data engine tracks the data and performs meaningful processing of the user behavior data 130 or other user data to provide various reports to the user. In addition, in some embodiments, the user data engine 128 also acts as a shared engine and is accessible by other engines to obtain meaningful analysis on the basis of which other engines can offer various functionalities to the user. In additional or alternative embodiments, each engine can have an instance of the user data engine 128, which is customized according to a need of that engine. In various embodiments, the user data engine 128 is used for tracking one or more types of content, such as mobile applications, video, image, website, document, advertisements, etc. In some embodiments, the user data engine 128 also supports predictive intelligence to provide predictions based on the user behavior data 130 or user data. In some embodiments, the user data engine 128 also stitches information tracked from various sources where the content is consumed and provides a holistic view (e.g., a 360 degree view) of the user behavior data 130 or other user data.

In some embodiments, the recommendation system 102 also includes a content personalization engine 132. The content personalization engine 132 enables the user to provide different digital experiences to the customers when different customers visit a same webpage or a same application of the user. The content personalization engine 132 provides various workflows to the user to create different versions of the webpage or application or the content and to perform A/B testing. Based on the testing, the user may choose to provide different personalization for different sets of customers. The content personalization engine 132 also uses the customer data 122. The customer data 122 includes customer profiles. The customers, as described herein, also include mere visitors that are not customers yet. A customer profile includes one or more attributes of the customer. An attribute, as described herein, is a concept using which the customer can be segmented. Examples of the attribute include, but are not limited to, geographical location, age, gender, purchase capacity, language, habits, browsing trends, or any other attribute using which the customers can be segmented.

The customer data 122, at least some of which may be included in the user behavior data 130 or stored separately from the user behavior data 130, is generated by a customer segmentation engine 134 by collecting data from different sources including electronic sources, such as the user data engine 128, online forms, customer submitting data online, and other online sources, and non-electronic sources including paper forms and other offline sources. The customer data 122 can be shared between users and some of the customer data 122 can be specific to each user and not accessible by other users. The customer segments are used by the customer segmentation engine 134 to personalize content and show relevant content to the customers. In addition, the content personalization engine 132 provides automated workflows to enable the personalization including providing recommendations for the content that should be shown to a particular customer segment.

In various embodiments, the customer data 122 also includes data regarding devices used by the customers. The device data is used for stitching customer data. For example, a customer 1 may use device 1 to visit website A. The customer 1 may use device 2 to visit website B. The website A and the website B may belong to the same user. So, instead of considering customer 1 as two different customers, the data including at least one common identifier such as, for example, an e-mail identifier, helps the user to identify that the two different visits were made by the same customer 1. Also, by analyzing the customer data 122 and the user behavior data 130 or other user data, richer customer profiles or segments can be generated. Also, devices that correspond to the same customer can be identified resulting in providing more targeted digital experience to the customer and making benefit for the user.

In some embodiments, the recommendation system includes the user data engine 128, a grouping engine 140, a machine-learning algorithm engine 142, a user cluster engine 144, and a recommendation engine 146.

The engines 128, 140, 142, 144, 146 each include one or more instructions stored on a computer-readable storage medium and executable by processors of one or more computing devices. When executed by the one or more processors, the computer-executable instructions of the recommendation system 102 cause the recommendation system 102 to learn user preferences and predict user behavior based on sequential user behavior data. In additional or alternative embodiments, the engines 128, 140, 142, 144, 146 include hardware, such as a special purpose processing device to perform a certain function or group of functions. Additionally or alternatively, the engines 128, 140, 142, 144, 146 each include a combination of computer-executable instructions and hardware.

In the example depicted in FIG. 1, one or more engines 128, 140, 142, 144, 146 of the recommendation system 102 and the data storage unit 112 communicate via the data network 108. For example, the data storage unit 112 transmits prior user action data 136 to the user data engine 128. Prior user action data 136 includes, but is not limited to, data about a prior action taken by a user of the one or more computing devices 104 or the recommendation system 102. Examples of prior user action data 136 include, but are not limited to, data about a location or a sequence of locations previously visited by the user, data about an offer (e.g., a sales offer) or a series of offers previously made to the user, data about a series of purchases previously made by the user, etc. In additional or alternative embodiments, the data storage unit 112 transmits user data 116 to the user data engine. The user data 116 includes, but is not limited to, any data associated with a user of the recommendation system 102 or the computing device 104. The user data 116 includes, for example, demographic data about the user, transaction data associated with the user, geographical location of the user, age of the user, gender of the user, purchase capacity of the user, language of the user, habits of the user, browsing trends of the user, any attribute of the user using which the user can be segmented or grouped, or any other data associated with the user. In some embodiments, the user data engine 128 receives or obtains user data 116 or prior user action data 136 from the one or more computing devices 104, the data storage unit 112, user input (e.g., if a user programs the user data engine 128 to include user behavior data 130 or other user data), or any other source.

In some embodiments, the recommendation system 102 learns user preferences and predicts user behavior based on prior user action data 136 or user data 116 to improve the recommendation of various actions to a user. For example, the grouping engine 140 is electrically or communicatively coupled to the user data engine 128 and the grouping engine 140 receives data obtained or received by the user data engine 128 (e.g., prior user action data 136 or user data 116) and processes the data. In some embodiments, the grouping engine 140 processes the data by grouping data received or obtained from the user data engine 128 into user groups or clusters.

For example, the prior user action data 136 or user data 116 includes data about various users and the grouping engine 140 receives the data about the various users from the user data engine 128. The grouping engine 140 groups the various users into various clusters or groups based on a similarity between the users (e.g., based on a similarity between a prior action of the various users or based on a similarity between data associated with the various users). As an example, the grouping engine 140 groups a first user and a second user together to form a first cluster based on a similarity between a prior action of the first user and a prior action of the second user (e.g., based on a similarity between a sequence of prior locations visited by the first and second users) or based on a similarity between data associated with the first and second users (e.g., based on a similarity between the age of the first and second users). In some embodiments, the grouping engine 140 groups a third user and a fourth user together to form a second cluster in substantially the same manner as described above.

In some embodiments, the grouping engine 140 is electrically or communicatively coupled to the machine-learning algorithm engine 142 and the machine-learning algorithm engine 142 receives or obtains data from the grouping engine 140. In some embodiments, the machine-learning algorithm engine 142 trains a machine-learning algorithm based on the data obtained or received from the grouping engine 140. For example, the machine-learning algorithm engine 142 receives data indicating one or more user groups or clusters formed by the grouping engine 140 and the machine-learning algorithm engine 142 trains the machine-learning algorithm based on the user groups or clusters. A machine-learning algorithm is a machine-learning model that uses statistical learning algorithms that are used to estimate or approximate functions that depend on a large number of inputs in a non-linear, distributed, and parallel manner. Examples of the machine-learning algorithm include a probabilistic suffix tree, a neural network, etc. A computer learning machine-learning algorithm is an interconnected group of nodes, called neurons. A machine-learning algorithm includes input nodes, output nodes, and intermediary nodes. In some embodiments, the connections between each node are weighted with a set of adaptive weights that are tuned by a learning algorithm, and are capable of approximating non-linear functions of their inputs. In some embodiments, the machine-learning algorithm engine 142 trains the machine-learning algorithm to learn how to accurately predict user behavior.

For instance, the machine-learning algorithm engine 142 receives data indicating the first cluster or group or data indicating the second cluster or group formed by the grouping engine 140. The machine-learning algorithm engine 142 trains the machine-learning algorithm to predict a subsequent action of the first or second user based on the first cluster. As an example, the machine-learning algorithm engine 142 trains the machine-learning algorithm to predict a subsequent location that the first or second user will visit based on the first cluster or group. In some embodiments, the machine-learning algorithm engine 142 also trains the machine-learning algorithm to predict a subsequent action of the third or fourth user based on the second cluster. In some examples, the machine-learning algorithm engine 142 trains the machine-learning algorithm to predict the subsequent action of the first, second, third, or fourth user using various methods or techniques.

In some embodiments, the recommendation system 102 uses the various clusters or groups to provide recommended actions to a user. For example, the user data engine 128 obtains or receives other user behavior data 130. As an example, the user data engine 128 obtains or receives current user action data 138 from the data storage unit 112. Current user action data 138 includes, but is not limited to, data about a current action taken by a user of the one or more computing devices 104 or the recommendation system 102. Examples of current user action data 138 include, but are not limited to, data about a current action of the user, a current location of the user, an offer (e.g., a sales offer) currently being made to the user, data about a purchase currently being made by the user, etc. In some embodiments, the user data engine 128 receives or obtains current user action data 138 from the one or more computing devices 104, the data storage unit 112, user input (e.g., if a user programs the user data engine 128 to include user behavior data 130 or other user data), or any other source.

In some embodiments, the user cluster engine 144 is electrically or communicatively coupled to the user data engine 128 and the user cluster engine 144 receives or obtains data from the user data engine 128. In some embodiments, the user cluster engine 144 determines a user cluster or group to associate with a user of the recommendation system 102 or the computing devices 104 such as, for example, a new user, based on data obtained or received from the user data engine 128.

For example, the user data engine 128 obtains data indicating current user action data 138 associated with the new user and user data 116 associated with the new user and transmits the data to the user cluster engine 144. The user cluster engine 144 associates the new user with the first cluster (e.g., includes the user in the first cluster) based on a similarity between a current action of the new user and a prior action of the first or second user (e.g., based on a similarity between a current location of the new user and a location in the sequence of prior locations visited by the first or second user) or based on a similarity between data associated with the new user and the first or second user (e.g., based on a similarity between the age of the new user and the first or second user). As another example, the user cluster engine associates the new user with the second cluster based on a similarity between a current action of the new user and a prior action of the third or fourth user or based on a similarity between data associated with the new user and the third or fourth user.

In some embodiments, the recommendation engine 146 is electrically or communicatively coupled to the user cluster engine 144 and the recommendation engine 146 receives or obtains data from the user cluster engine 144. In some embodiments, the recommendation engine 146 is also electrically or communicatively coupled to the machine-learning algorithm engine 142. The recommendation engine 146 determines a recommended sequence of actions to be provided to the new user based on data received or obtained from the user cluster engine 144. In some embodiments, the recommendation system 102 outputs one or more actions of the recommended sequence of actions to the new user.

For example, the recommendation engine 146 obtains data indicating a user cluster or group associated with the new user (e.g., the first cluster or the second cluster) and the recommendation engine 146 uses the machine-learning algorithm trained by the machine-learning algorithm engine 142 to determine a recommended sequence of actions to be provided to the new user based on the user cluster or group associated with the new user. For instance, the recommendation engine 146 determines a recommended sequence of locations to be provided to the new user based on the first cluster in response to the new user being associated with the first cluster (e.g., by the user cluster engine 144). In some embodiments, the recommended sequence of locations includes one or more locations in the first or second sequence of locations. The recommendation system 102 can then output one or more of locations of the sequence of locations to the new user.

In some embodiments, the recommendation system 102 uses the various engines 128, 140, 142, 144, 146 to iteratively learn preferences of the new user to determine additional recommended sequences of actions to be provided to the new user. For example, the user data engine 128 obtains or receives data indicating a subsequent current action of the new user and transmits the data to the user cluster engine 144. The user cluster engine 144 compares the subsequent current action of the new user to the recommended sequence of actions provided to the new user to determine whether the subsequent current action corresponds to the recommended action. In some embodiments, the user cluster engine 144 determines a cluster (e.g., the first cluster or the second cluster) to associate with the new user based on whether the subsequent current action corresponds to the recommended action and the recommendation engine 146 determines another recommended sequence of actions to be provided to the new user based on the cluster.

For example, as described above, the recommendation engine 146 determines a first recommended sequence of locations to be provided to the new user based on the first cluster. The user data engine 128 obtains data indicating a subsequent current location of the new user and transmits the data to the user cluster engine 144. The user cluster engine 144 associates the new user with the first cluster if the subsequent current location of the new user corresponds to a location in the recommended sequence of locations. In this example, the recommendation engine 146 can determine another recommended sequence of locations to be provided to the new user based on the first cluster in substantially the same manner as described above, or may not do so, in response to the subsequent current location corresponding to a location in the recommended sequence of locations. In another example, the user cluster engine 144 associates the new user with the second cluster if the subsequent current location of the new user corresponds to a location in the sequence of prior locations visited by the third or fourth user and the recommendation engine 146 determines another recommended sequence of locations to be provided to the new user based on the second cluster.

In this manner, the recommendation system 102 iteratively learns user preferences using sequential user behavior data (e.g., prior user action data 136), which can be used to accurately predict user behavior (e.g., predict behaviors of the first, second, third, or fourth user) and improve the recommendation of various actions to a user (e.g., the recommendation of various actions to a new user such as, for example, a fifth user).

While in the examples described above, the recommendation system 102 learns user location preferences to provide a recommended sequence of locations to a new user, the present disclosure is not limited to such configurations. Rather, in other examples, the recommendation system 102 learns user preferences using any sequential user behavior data and accurately predicts any user behavior and improves the recommendation of various actions to a user in various applications. Further, while in the examples described above, the recommendation system 102 learns user behavior data by clustering users based on a sequence of locations visited by prior users, the present disclosure is not limited to such configurations. Rather, in other examples, the recommendation system 102 can cluster or group users based on any user data or user behavior data.

In the example depicted in FIG. 1, a user can interface with the one or more computing devices 104 to access the recommendation system 102. In some embodiments, each of the computing devices 104 represents various types of client devices. For example, the computing device 104 is a mobile device (e.g., a mobile telephone, a smartphone, a PDA, a tablet, a laptop, a camera, a tracker, a watch, a wearable device, etc.). The computing device 104, however, in some embodiments, is a non-mobile device (e.g., a desktop computer or another type of client device). In some embodiments, the recommendation system 102 is executed on the one or more computing devices 104 via a recommendation application 148. In this example, the computing devices 104 includes one or more of the components of the recommendation system 102.

Figure 2:
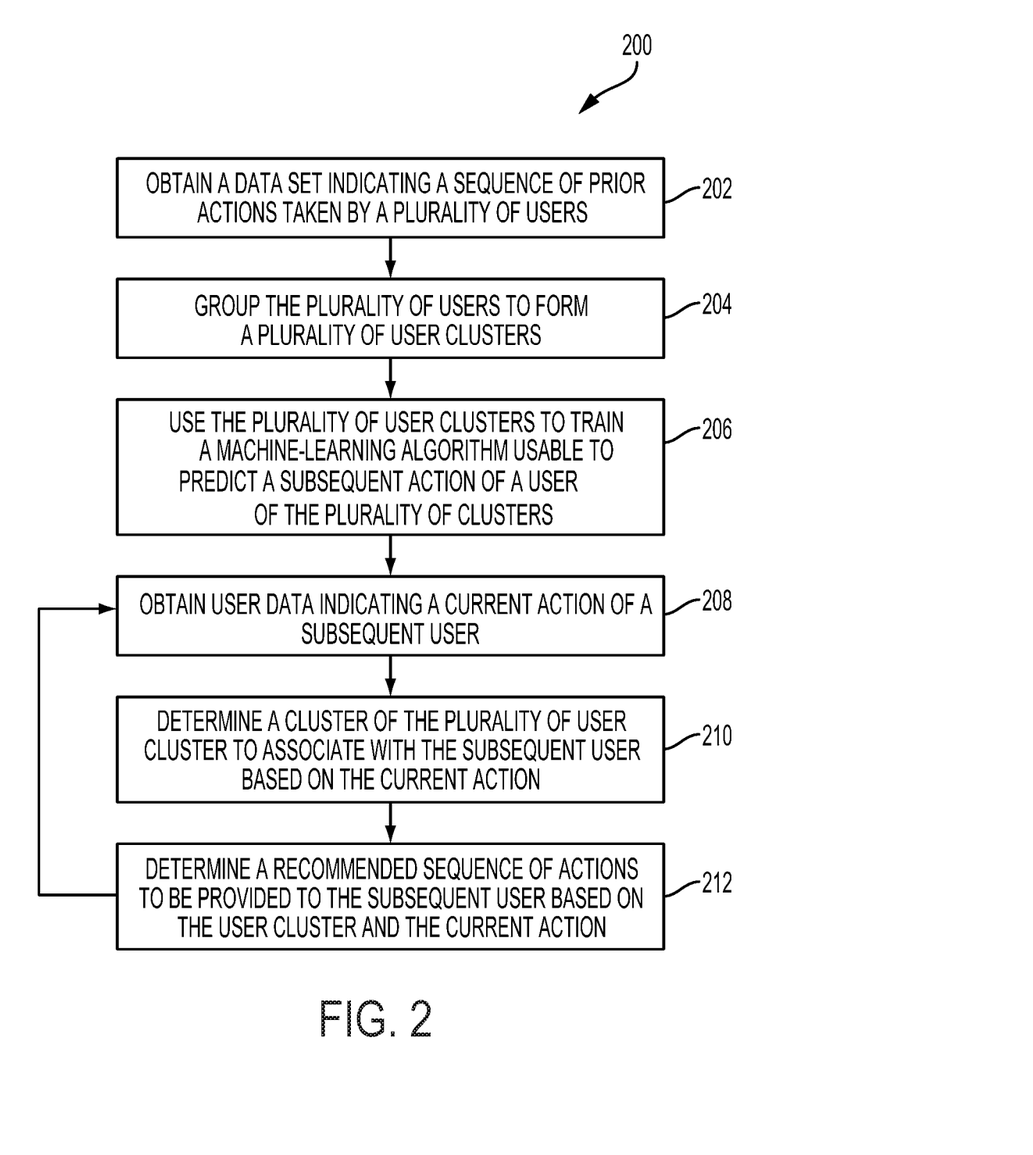
FIG. 2 is a flow chart depicting an example of a process for learning user preferences and predicting user behavior based on sequential user behavior data to improve recommendation of various actions to a user, according to certain embodiments.

FIG. 2 is a flow chart depicting an example of a process 200 for learning user preferences and predicting user behavior based on sequential user behavior data to improve recommendation of various actions to a user. In some embodiments, one or more processing devices, such as, for example, the computing system described herein with respect to FIG. 4, implement operations depicted in FIG. 2 by executing suitable program code (e.g., the recommendation system 102 of FIG. 1) that implements one or more algorithms encompassed by the process 200. For illustrative purposes, the process 200 is described with reference to the examples depicted in FIG. 1, but other implementations are possible.

In block 202, a data set indicating a sequence of prior actions taken by various users is obtained. In some embodiments, a user data engine 128 obtains the data set, which includes prior user action data 136 or user data 116. For example, the user data engine 128 obtains or receives the data set from one or more computing devices 104, a data storage unit 112, user input (e.g., if a user programs the user data engine 128 to include the data set), or any other source.

In some embodiments, the user data engine 128 accesses the data set from a non-transitory computer-readable medium that is local to the computing system that executes the user data engine 128. Accessing the prior user action data 136 or the user data 116 involves transmitting suitable electronic signals via a data bus that communicatively couples the non-transitory computer-readable medium and the processing device. These signals cause at least some of the data from the non-transitory computer-readable medium to be stored in a random-access memory or other memory device that allows rapid retrieval of data for processing operations performed by the computing system that executes the user data engine 128.

In additional or alternative embodiments, the user data engine 128 accesses, via a data network 108, at least some of the prior user action data 136 or user data 116 from a non-transitory computer-readable medium that is remote from the computing system that executes the user data engine 128. Accessing the prior user action data 136 or user data 116 involves transmitting suitable electronic signals via a network interface device that communicatively couples, via the data network 108, a computing system that executes the user data engine 128 with another computing system that is communicatively coupled to the non-transitory computer-readable medium via a data bus or other form of local access. These signals cause at least some of the data from the non-transitory computer-readable medium to be transmitted over the data network 108, received via the network interface device of the computing system that executes the user data engine 128, and stored in a random-access memory or other memory device that allows rapid retrieval of data for processing operations performed by the computing system that executes the user data engine 128.

In some embodiments, the data set obtained at block 202 includes data about a prior action taken by various users of the computing devices 104 or the recommendation system 102 or any data associated with the user. For example, the data set includes data about a location or a sequence of locations previously visited by the user, data about an offer or a series of offers previously made to the user, a series of purchases previously made by the user, demographic data about the user, transaction data associated with the user, geographical location of the user, age of the user, gender of the user, purchase capacity of the user, language of the user, habits of the user, browsing trends of the user, any attribute of the user using which the user can be segmented or grouped, etc.

In block 204, the various users are grouped to form various user clusters or user groups. In some embodiments, one or more processing devices execute a grouping engine 140 to perform a user cluster or grouping algorithm based on the data obtained at block 202. The user cluster or grouping algorithm includes identifying or determining a similarity between the users and grouping the various users into clusters based on the similarity.

In some embodiments, the grouping engine 140 determines the similarity between the users using any suitable grouping or clustering method or technique. Examples of a suitable grouping or clustering algorithm include, but are not limited to, hierarchical clustering, k-means clustering, Markov model clustering, any combination of these methods, etc. For example, hierarchical clustering can involve determining a similarity or a dissimilarity between the various users and iteratively grouping the users based on the similarity between two or more users.

In some embodiments, the grouping engine 140 retrieves code for performing the grouping or clustering algorithm from a non-transitory computer-readable medium (e.g., by communicating suitable signals to a non-transitory computer-readable medium via a data bus or a data network 108). The grouping engine then executes the retrieved code using the data set obtained at block 202 or a subset of the data set.

For example, the data set obtained at block 202 includes data about a first sequence of locations visited by a first user of the computing devices 104 or the recommendation system 102, a second sequence of locations visited by a second user of the computing device 104 or the recommendation system 102, a third sequence of locations visited by a third user of the computing device 104 or the recommendation system 102, and a fourth sequence of locations visited by a fourth user of the computing device 104 or the recommendation system 102. The grouping engine 140 receives or obtains the data set from the user data engine 128 and uses a grouping or clustering algorithm (e.g., k-means clustering, hierarchical clustering, Markov model clustering, etc.) to analyze the first, second, third, and fourth sequence of locations to group the first, second, third, and fourth users to form one or more user clusters or groups.

As an example, the grouping engine 140 compares the first sequence of locations visited by the first user and the second sequence of locations visited by the second user by comparing a location in the first sequence of locations to a location in the second sequence of locations and determines a similarity between the first sequence of locations and the second sequence of locations based on the comparison. The grouping engine 140 groups the first user and the second user into a first cluster or group based on the similarity between the first sequence of locations and the second sequence of locations (e.g., based on the first and second sequences being substantially similar or based on the similarity between the first and second sequences being above a similarity threshold). In some embodiments, the grouping engine 140 also compares the third sequence of locations visited by the third user and the fourth sequence of locations visited by the fourth user and determines a similarity between the third and fourth sequences. The grouping engine 140 then groups the third user and the fourth user into a second cluster or group based on the similarity between the third sequence of locations and the fourth sequence of locations.

In block 206, the various clusters (e.g., the various clusters formed in block 204) are used to train a machine-learning algorithm that can be used to predict a subsequent action of a user among the various users. In some embodiments, one or more processing devices execute a machine-learning algorithm engine 142 to train one or more machine-learning algorithms based on the various user groups or clusters formed by the user cluster engine 144. In some embodiments, the machine-learning algorithm engine 142 trains the machine-learning algorithm to learn how to accurately predict user behavior. Examples of the machine-learning algorithm include a probabilistic suffix tree, a neural network, etc.

For example, the machine-learning algorithm engine 142 receives data indicating the first cluster or group (e.g., the first cluster or group that includes the first and second users) and the second cluster or group (e.g., the second cluster or group that includes the third and fourth users) and the machine-learning algorithm engine 142 trains the machine-learning algorithm to predict a subsequent action of the first, second, third, or fourth user based on the first or second cluster. As an example, the machine-learning algorithm engine 142 trains the machine-learning algorithm to predict a subsequent location that the first or second user will visit based on the first cluster. In some embodiments, the machine-learning algorithm engine 142 also trains the machine-learning algorithm to predict a subsequent location that the third or fourth user will visit based on the second cluster.

In some embodiments, the machine-learning algorithm engine 142 trains the machine-learning algorithm to predict the subsequent action of the first, second, third, or fourth user using various methods and techniques, such as, for example, using a Partially Observable Markov Decision Process ("POMDP"), which can allow for modeling of sequential processes (e.g., a series of actions that the first, second, third, or fourth user will take).

For example, the machine-learning algorithm engine 142 trains the machine-learning algorithm using POMDP, which involves mapping the first, second, third, or fourth user's current state (e.g., action) such as, for example, current location, with a potential action of the first, second, third, or fourth user (e.g., going to another or next location). The machine-learning algorithm engine 142 trains the machine-learning algorithm to use POMDP to determine a probability distribution of a future state of the first, second, third, or fourth user (e.g., a probability distribution of the first, second, third, or fourth user subsequently going to a particular subsequent location). Based on the probability distribution, the machine-learning algorithm engine 142 trains the machine-learning algorithm to predict a subsequent action of the first, second, third, or fourth user (e.g., a subsequent location of the first, second, third, or fourth user). As an example, the machine-learning algorithm engine 142 to train the machine-learning algorithm to predict a particular subsequent location of the first user based on the particular subsequent location having a highest probability among various locations that the first user can visit (e.g., having the highest probability that the first user will subsequently visit the particular location).

In block 208, user data indicating a current action of a subsequent user is obtained. In some embodiments, the user data engine 128 obtains the user data, which includes user behavior data 130 or current user action data 138. For example, the user data engine 128 obtains or receives the user data from one or more computing devices 104, the data storage unit 112, user input (e.g., if a user programs the user data engine 128 to include the user data), or any other source.

In some embodiments, the user data engine 128 accesses the user data from a non-transitory computer-readable medium that is local to the computing system that executes the user data engine 128. Accessing the current user action data 138 involves transmitting suitable electronic signals via a data bus that communicatively couples the non-transitory computer-readable medium and the processing device. These signals cause at least some of the data from the non-transitory computer-readable medium to be stored in a random-access memory or other memory device that allows rapid retrieval of data for processing operations performed by the computing system that executes the user data engine 128.

In additional or alternative embodiments, the user data engine 128 accesses, via a data network 108, at least some of the current user action data 138 from a non-transitory computer-readable medium that is remote from the computing system that executes the user data engine 128. Accessing the current user action data 138 involves transmitting suitable electronic signals via a network interface device that communicatively couples, via a data network, a computing system that executes the user data engine 128 with another computing system that is communicatively coupled to the non-transitory computer-readable medium via a data bus or other form of local access. These signals cause at least some of the data from the non-transitory computer-readable medium to be transmitted over the data network 108, received via the network interface device of the computing system that executes the user data engine 128, and stored in a random-access memory or other memory device that allows rapid retrieval of data for processing operations performed by the computing system that executes the user data engine 128.

In some embodiments, the user data (e.g., the current user action data 138) obtained at block 208 includes data about a current action taken by a subsequent user of the one or more computing devices 104 or the recommendation system 102. Examples of current user action data 138 include, but are not limited to, data about a current location of the user, data about an offer (e.g., a sales offer) currently being made to the user, data about a purchase currently being made by the user, etc.

In block 210, a cluster of the various user clusters (e.g., the various user clusters formed in block 204) to associate with the subsequent user is determined based on the current action of the subsequent user (e.g., the current action in block 208). In some embodiments, one or more processing devices execute a user cluster engine 144 to determine the cluster of the various user clusters to associate with the subsequent user.

For example, the user data obtained at block 208 includes data about a current action of the subsequent user and the user cluster engine 144 receives or obtains the user data from the user data engine 128. In some embodiments, the user cluster engine 144 determines a user cluster or group among the various user clusters or groups formed by the grouping engine 140 (e.g., in block 204) to associate with the subsequent user based on the user data obtained or received from the user data engine 128.

As an example, the user data engine 128 obtains or receives data indicating a current location of the subsequent user (e.g., a fifth user) and the user data engine 128 transmits data indicating the current location to the user cluster engine 144. The user cluster engine 144 determines a user cluster or group (e.g., the first cluster or group that includes the first and second users or the second cluster or group that includes the third and fourth users) to associate with the subsequent user based on the current location of the subsequent user. For instance, the user cluster engine 144 compares the current location of the subsequent user to a location in the first sequence of locations visited by the first user or a location in the second sequence of locations visited by the second user. The user cluster engine 144 also compares the current location of the subsequent user to a location in the third sequence of locations visited by the third user or a location in the fourth sequence of locations visited by the fourth user. In this example, the user cluster engine 144 associates the subsequent user with the first cluster (e.g., includes the subsequent user in the first cluster) if the current location of the subsequent user corresponds to a location in the first sequence of locations or a location in the second sequence of locations (e.g., if the current location of the subsequent user is substantially similar to a location of the first or second sequence of locations). As another example, the user cluster engine 144 associates the subsequent user with the second cluster if the current location of the subsequent user corresponds to a location in the third or fourth sequence of locations. While in this example, the user cluster engine 144 determines a user cluster or group to associate with the subsequent user based on location, the present disclosure is not limited to such configurations. Rather, in other examples, the user cluster engine 144 determines the cluster or group to associate with the subsequent user based on any other data associated with the subsequent data. As an example, the user cluster engine 144 associates the subsequent user with the first cluster based on a similarity between data associated with the subsequent user and the first or second user (e.g., based on a similarity between the purchase capacity of the subsequent user and the first user).

In block 212, a recommended sequence of actions to be provided to the subsequent user is determined based on the user cluster associated with the subsequent user and the current action of the subsequent user. In some embodiments, one or more processing devices execute a recommendation engine 146 to determine the recommended sequence of actions to be provided to the subsequent user.

For example, the recommendation engine 146 obtains or receives data indicating a user cluster or group associated with the subsequent user (e.g., in block 210) and the recommendation engine 146 uses the machine-learning algorithm trained by the machine-learning algorithm engine 142 (e.g., in block 206) to determine a recommended sequence of actions to be provided to the new user based on the user cluster or group associated with the subsequent user. As an example, the subsequent user is associated with the first cluster based on a current location of the subsequent user (e.g., in block 210). The recommendation engine 146 determines a recommended sequence of locations to be provided to the subsequent user based on the first cluster (e.g., based on the first sequence of locations or the second sequence of locations). In this example, the recommended sequence of locations corresponds to the first sequence of locations or the second sequence of locations, or any combination of one or more locations in the first or second sequence of locations.

In some embodiments, the recommendation engine 146 uses the machine-learning algorithm trained by the machine-learning algorithm engine 142 (e.g., in block 206) to determine the recommended sequence of actions using the probability distribution developed using the POMDP (e.g., the probability distribution developed in block 206). For example, the recommendation engine 146 uses the machine-learning algorithm and the probability distribution to determine a sequence of locations having a highest probability of being visited by the subsequent user from among various sequences of locations. The recommendation engine 146 then recommends the sequence of locations to the subsequent user. In some aspects, the recommendation engine 146 approximates the POMDP model described above by having various clusters and each cluster is modeled with a probabilistic suffix tree. In some examples, the recommendation system 146 uses each probabilistic suffix tree to determine a sequence of locations or points-of-interest to be provided to the subsequent user. In some aspects, the probability of the subsequent user visiting a sequence of locations or points-of-interest from among various sequences of locations or points-of-interest can be created heuristically from passive dynamics (e.g., created from a probability of the subsequent user switching from one sequence of locations to another sequence of locations regardless of being provided with a recommended sequence of locations). In some aspects, the recommendation engine 146 uses the machine-learning algorithm to approximate an optimal POMDP model using various methods and techniques, such as, for example, Thompson Sampling.

In another embodiment, the recommendation engine 146 uses various methods and techniques to determine the recommended sequence of actions to be provided to the subsequent user including, for example, Thomas sampling methods, which can involve creating a probability distribution based on the various actions that can be provided to the subsequent user and developing a model based on the distribution. The recommendation engine 146 uses the model to determine the recommended sequence of actions to be provided to the subsequent user. In this example, the recommendation engine 146 then updates the probability distribution based on actions taken by the subsequent user (e.g., the recommendation engine 146 creates a new probability distribution based on the subsequent user's next action and develops a new model based on the new probability distribution).

In some embodiments, in block 212, the recommendation system 102 provides the recommended sequence of actions or one or more actions among the recommended sequence of actions to the subsequent user. For example, the recommendation system 102 provides a location among the recommended sequence of locations or the recommended sequence of locations to the subsequent user to allow the subsequent user to visit the one or more recommended locations.

In some embodiments, the process 200 can include iteratively determining a recommended sequence of actions to be provided to the subsequent user based on a user cluster associated with the subsequent user and a current action of the subsequent user.

For example, the user data engine 128 obtains or receives user data indicating an updated current action of the subsequent user (e.g., in block 208) and transmits the data to the user cluster engine 144 (e.g., in block 210). The user cluster engine 144 compares the updated current action of the subsequent user to the recommended sequence of actions to determine whether the updated current location of the subsequent user corresponds to an action in the recommended sequence of actions. In some embodiments, the user cluster engine 144 determines a cluster to (e.g., the first cluster or the second cluster) to associate with the subsequent user based on the updated current location (e.g., by iterating block 210). The recommendation engine 146 then determines another recommended sequence of actions to be provided to the subsequent user based on the cluster (e.g., by iterating block 212).

For instance, the recommendation engine 146 determines a first recommended sequence of locations based on the first cluster (e.g., in block 212). The user data engine 128 obtains or receives data indicating an updated current location of the subsequent user (e.g., in block 208). The user cluster engine 144 obtains or receives the data indicating the updated current location and iteratively associates the subsequent user with the first cluster if the updated current location corresponds to a location in the recommended sequence of locations (e.g., by iterating block 210). In this example, the recommendation engine 146 can determine another recommended sequence of locations to be provided to the subsequent user based on the first cluster (e.g., by iterating block 212) or may not do so (e.g., cease the iterative process 200).

In another example, the user cluster engine 144 associates the subsequent user with the second cluster (e.g., by iterating block 210) if the updated current location of the subsequent user corresponds to a location in the third sequence of locations visited by the third user or a location in the fourth sequence of locations visited by the fourth user. In this example, the recommendation engine 146 determines another recommended sequence of locations to be provided to the subsequent user based on the second cluster (e.g., by iterating block 212).

Figure 3:
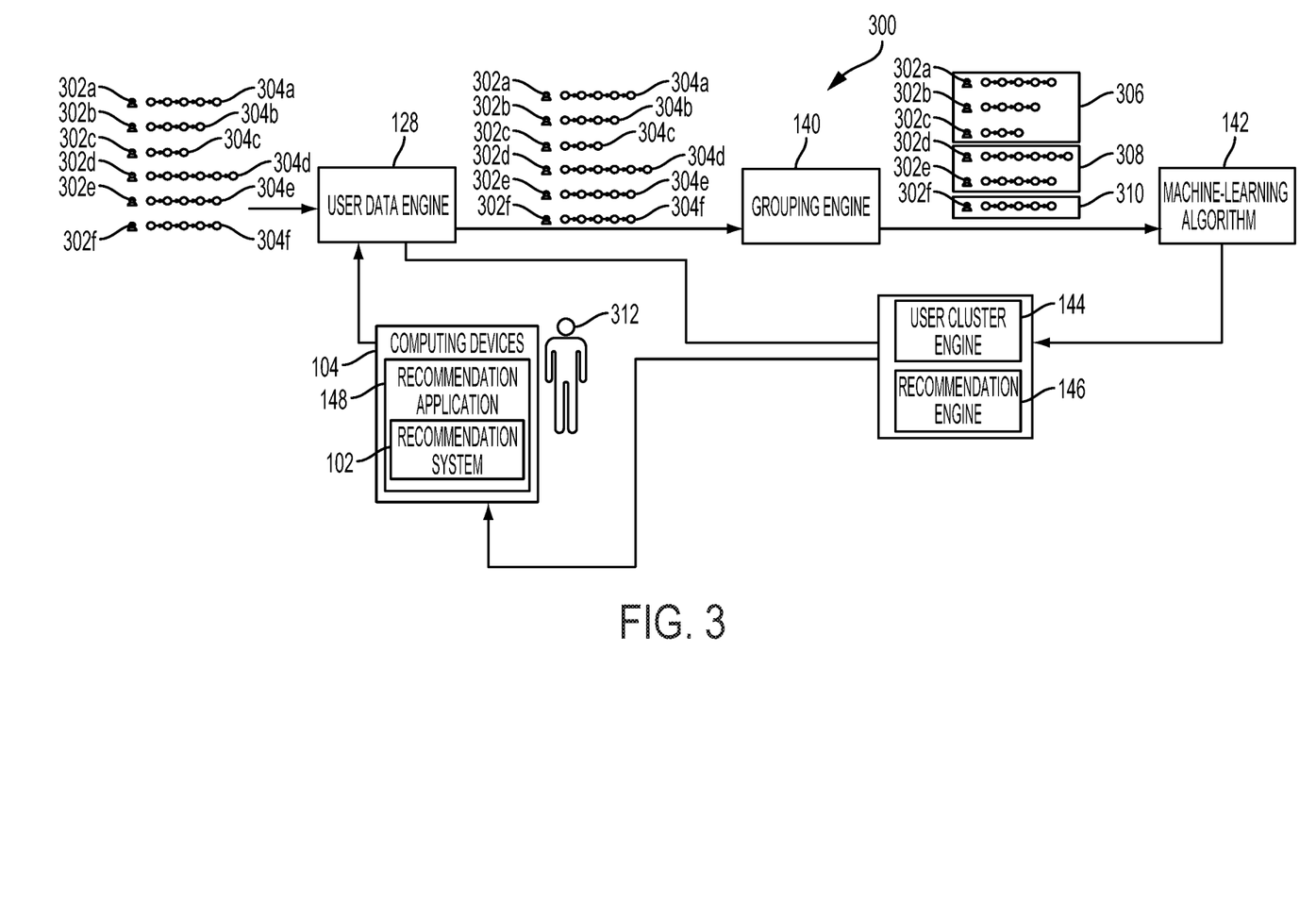
FIG. 3 illustrates an example of a recommendation system that learns user preferences and predicts user behavior based on sequential user behavior data to improve recommendation of various actions to a user, according to certain embodiments.

FIG. 3 illustrates an example of a recommendation system 300 that can learn user preferences and predict user behavior based on sequential user behavior data to improve recommendation of various actions to a user, according to certain embodiments. The recommendation system 300 is described with reference to the environment 100 of FIG. 1 and the process 200 of FIG. 2, but other implementations are possible.

In the example depicted in FIG. 3, a data set indicating trajectories or sequences 304a-f of prior locations visited by various users 302a-f is obtained or received by the user data engine 128 (e.g., in block 202). The user data engine 128 transmits the data set to the grouping engine 140, which groups the users 302a-f into various personas, groups or clusters 306, 308, 310 based on a similarity between the users (e.g., based on a similarity between the sequences 304a-f). In some examples, one or more of the users 302a-f can be grouped or assigned into an individual or new persona, group, or clusters if the user is not similar to one or more of the other users 302a-f (e.g., if a sequence of prior locations visited by the user is not similar to a sequence of prior locations visited by one or more of the other users). In the example depicted in FIG. 3, the grouping engine 140 groups users 302a-c into a first cluster 306, groups users 302d-e into a second cluster 308, and groups user 302f into a third cluster 310 (e.g., in block 204). In this example, the user 302f is grouped into or assigned to the third cluster 310, which can be a new cluster that includes only the user 302f in response to the grouping engine 140 determining that the sequence 304f associated with the user 302f is not similar to one or more of the sequences 304a-e associated with the other users 302a-e (e.g., not similar to the sequence of prior locations visited by any of the users 302a-e).

The data indicating the various clusters 306, 308, 310 is provided to the machine-learning algorithm engine 142, which trains a machine-learning algorithm to predict a subsequent location that one of the users 302a-f will visit based on the clusters 306, 308, 310 (e.g., in block 206). For example, the machine-learning algorithm engine 142 trains the machine-learning algorithm to predict a subsequent location that the user 302a will visit based on the cluster 306.

The user data engine 128 then obtains or receives user data indicating a current location of a subsequent user 312 (e.g., in block 208). For example, the computing device 104 includes a global positioning system ("GPS") for providing data indicating the current location of the subsequent user 312 to the user data engine 128. In this example, the user cluster engine 144 receives the data indicating the current location of the subsequent user 312 from the user data engine 128 and then determines a cluster of the various clusters 306, 308, 310 to associate with the subsequent user 312 based on the current location of the subsequent user 312 (e.g., in block 210). For example, the user cluster engine 144 associates the subsequent user 312 with the cluster 306 based on the current location of the subsequent user 312 corresponding to one or more locations visited by the users 302a-c (e.g., one or more locations in the sequences 304a-c of prior locations visited by the users 302a-c).

The recommendation engine 146 then determines a recommended sequence of locations to be provided to the subsequent user 312 that the subsequent user 312 can visit (e.g., in block 212). For example, the recommendation engine 146 determines the recommended sequence of locations based on the cluster 306 associated with the subsequent user 312. In some embodiments, the recommended sequence of locations includes one or more locations visited by the users 302a-c (e.g., one or more locations in the sequences 304a-c of prior locations visited by the users 302a-c). In this example, the recommended sequence of locations or one or more locations of the recommended sequence of locations is provided to the subsequent user 312 via the computing device 104 (e.g., via a display of the computing device).

In this example, the recommendation system 300 iteratively determines recommended sequences of locations to be provided to the subsequent user 312 based on a user cluster associated with the subsequent user 312 and a current location of the subsequent user 312.

For example, the recommendation engine 146 determines a first recommended sequence of locations to be provided to the user based on the cluster 306 associated with the subsequent user 312 as described above. The user data engine 128 subsequently obtains or receives an updated location of the subsequent user 312 via the computing device 104 (e.g., from the GPS of the computing device 104). The user data engine 128 provides the data indicating the updated location of the subsequent user 312 to the user cluster engine 144 and the user cluster engine 144 associates the subsequent user 312 with the cluster 306 if the updated location corresponds to a location in the recommended sequence of locations (e.g., corresponds to one or more locations in the sequences 304a-c of prior locations visited by the users 302a-c). In this example, the recommendation engine 146 may determine another recommended sequence of locations to be provided to the subsequent user 312 based on the cluster 306 (e.g., another combination of one or more locations in the sequences 304a-c of prior locations visited by the users 302a-c) or may not do so.

In another example, the user cluster engine 144 associates the subsequent user 312 with another cluster 308 if the updated location of the subsequent user 312 corresponds to one or more locations visited by the users 302d-e (e.g., one or more locations in the sequences 304d-e of prior locations visited by the users 302d-e). In this example, the recommendation engine 146 determines another recommended sequence of locations to be provided to the subsequent user 312 based on the cluster 308. In this example, the other recommended sequence of locations includes one or more locations visited by the users 302d-e (e.g., one or more locations in the sequences 304d-e of prior locations visited by the users 302d-e).

In this manner, the recommendation system 300 trains a machine-learning algorithm and uses the machine-learning algorithm to iteratively learn preferences of users 302a-f, using sequential user behavior data to accurately predict subsequent user behavior and improve recommendation of various sequences of actions (e.g., locations) to the subsequent user 312.

While in the examples described in FIG. 3, the recommendation system 300 learns user location preferences to provide a recommended sequence of locations to a subsequent user, the present disclosure is not limited to such configurations. Rather, in other examples, the recommendation system 300 learns user preferences using any sequential user behavior data and accurately predicts any user behavior and improves the recommendation of various actions to a user in various applications.

System Implementation Example

Figure 4:
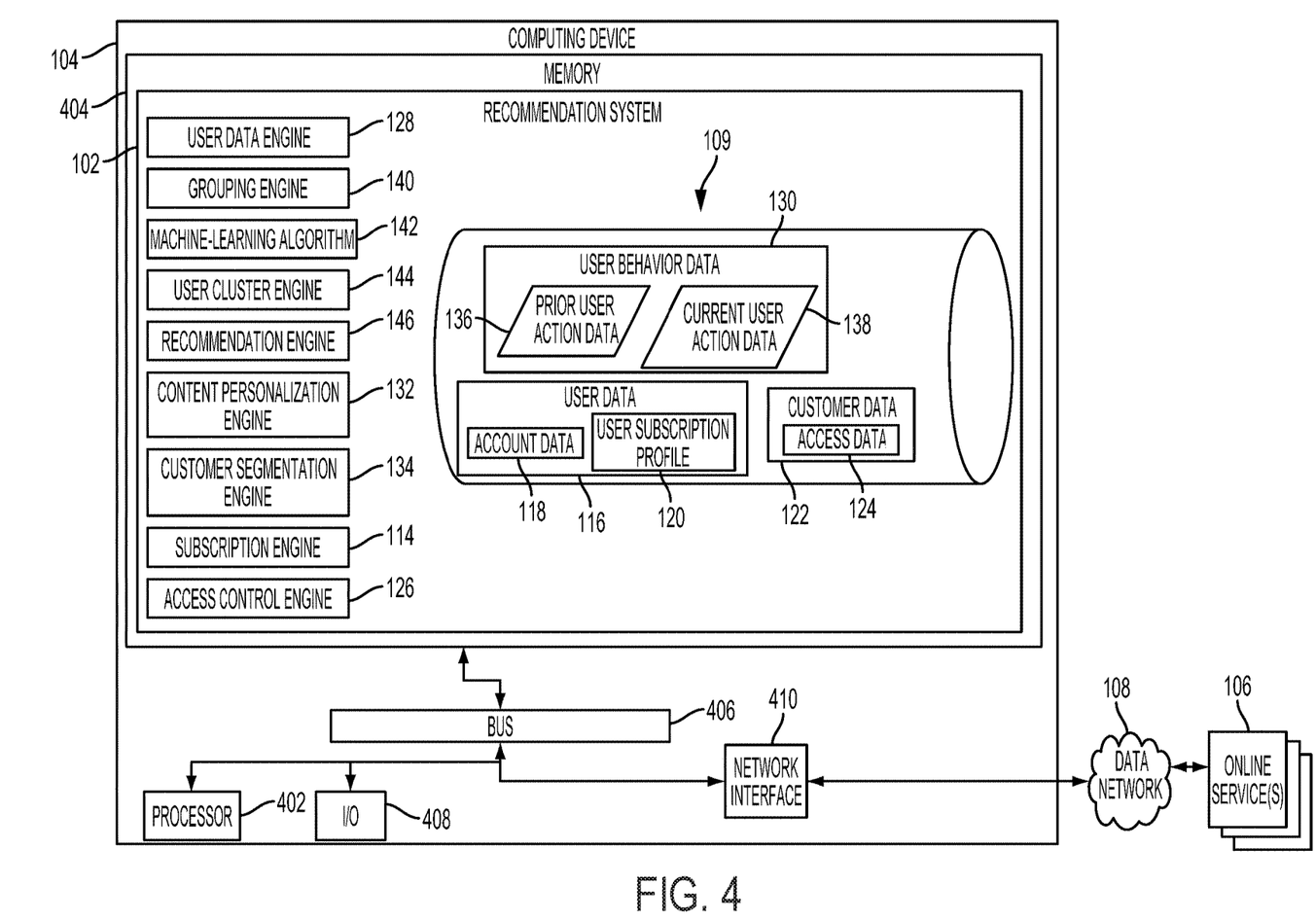
FIG. 4 is an example of a block diagram of a computing device that executes a recommendation system for learning user preferences and predicting user behavior based on sequential user behavior data to improve recommendation of various actions to a user, according to certain embodiments.

Any suitable computing system or group of computing systems can be used for performing the operations described herein. FIG. 4 is an example of a block diagram of a computing device 104 that executes a recommendation system 102 to perform the operations described herein.

The depicted example of the computing device 104 includes one or more processors 402 communicatively coupled to one or more memory devices 404. The processor 402 executes computer-executable program code stored in the memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including one or more processors 402 that are configured by program code to implement the operations described above, such as the operations depicted in FIG. 2 that are described with respect to processing devices.

The memory device 404 includes any suitable non-transitory computer-readable medium for storing the recommendation system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 404 are used to implement the operations described above, such as the operations depicted in FIG. 2 that are described with respect to one or more non-transitory computer-readable media.

The computing device 104 may also include a number of external or internal devices such as input or output devices. For example, the computing device 104 is shown with an input/output ("I/O") interface 408 that can receive input from input devices or provide output to output devices. A bus 406 can also be included in the computing device 104. The bus 406 can communicatively couple one or more components of the computing device 104. In some embodiments, the bus 406 is used to implement the operations described above with respect to FIG. 2 that involve communicating signals via a data bus.

The computing device 104 executes program code that configures the processor 402 to perform one or more of the operations described above with respect to FIGS. 1-3. The program code includes, for example, the user data engine 128, grouping engine 140, machine-learning algorithm engine 142, user cluster engine 144, recommendation engine 146, content personalization engine 132, customer segmentation engine 134, subscription engine 114, access control engine 126 or other suitable applications that perform one or more operations described herein. The program code may be resident in the memory device 404 or any suitable computer-readable medium and may be executed by the processor 402 or any other suitable processor. In some embodiments, the program code described above is stored in the memory device 404, as depicted in FIG. 4. In additional or alternative embodiments, the program code described above is stored in one or more memory devices accessible via a data network.

The computing device 104 accesses the user behavior data 130 in any suitable manner. In some embodiments, the user behavior data 130 is stored in one or more memory devices accessible via a data network 108, as in the example depicted in FIG. 4. In additional or alternative embodiments, some or all of the user behavior data 130 is stored in the memory device 404.

The computing device 104 depicted in FIG. 4 also includes at least one network interface 410. The network interface 410 includes any device or group of devices suitable for establishing a wired or wireless data connection to one or more data networks 108. Non-limiting examples of the network interface 410 include an Ethernet network adapter, a modem, and/or the like. The computing device 104 is able to communicate with one or more online services 106 using the network interface 410. In some embodiments, the network interface 410 is used to implement the operations described above with respect to FIG. 2 that involve communicating signals via a data network.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method for learning user preferences for accurately predicting user behavior based on sequential user behavior data, the method comprising:
   obtaining, by a processor, a plurality of sequences, each of the plurality of sequences comprising prior locations visited by a corresponding user of a plurality of users;
   clustering, by the processor, the plurality of users into a plurality of user clusters, wherein each user cluster comprises a subset of the users and wherein each subset includes users having corresponding sequences that include at least one prior location in common;
   training, by the processor, a machine-learning model to predict subsequent locations of users associated with each user cluster, wherein the machine-learning model determines, for each user of each user cluster, probability distribution of sequences of locations to be visited by the user based on the sequences included in the user cluster;
   obtaining, by the processor, user data indicating a current location of a subsequent user;
   determining, by the processor, a user cluster of the plurality of user clusters to associate with the subsequent user based on the current location;
   determining, by the processor, a recommended sequence of locations to be provided to the subsequent user, wherein the recommended sequence of locations is determined by providing, to the machine-learning model the user cluster associated with the subsequent user and the current location; and
   selecting, from the probability distribution of sequences of locations determined by the machine-learning model, a sequence of locations having a highest indicated probability of being visited by the subsequent user.

2. The method of claim 1, wherein the clustering comprises:
   comparing, by the processor, a first location visited by a first user of the plurality of users and a second location visited by a second user of the plurality of users to determine a similarity between the first location and the second location; and
   grouping, by the processor, the first user and the second user to form a first user cluster based on the similarity.

3. The method of claim 1, further comprising providing, to the machine-learning model, a current location of the subsequent user, wherein the machine-learning model updates the probability distribution of sequences of locations based on the current location.

4. The method of claim 1, wherein determining the probability distribution of sequences of locations comprises using a partially-observable Markov decision process (POMDP).

5. The method of claim 4, further comprising:
   determining, by the processor, a trajectory associated with each user of the plurality of users, wherein the trajectory indicates an order of prior locations associated with the user, and wherein the clustering further comprises grouping the plurality of users based at least in part on a similarity between trajectories associated with the plurality of users.

6. The method of claim 1, wherein determining the probability distribution of sequences of locations comprises approximating a partially-observable Markov decision process by modeling each user cluster of the plurality of user clusters with a probabilistic suffix tree.

7. The method of claim 1, further comprising outputting, by the processor, a recommended location of the recommended sequence of locations to the subsequent user.

8. A system comprising:
   a processing device; and
   a non-transitory computer-readable medium communicatively coupled to the processing device, wherein the processing device is configured to perform operations comprising:
   obtaining a plurality of sequences, each of the plurality of sequences comprising prior locations visited by a corresponding user of a plurality of users;
   clustering the plurality of users into a plurality of user clusters, wherein each user cluster comprises a subset of the users and wherein each subset of the users includes users having corresponding sequences that include at least one prior location in common;
   training a machine-learning model to predict subsequent locations of users associated with each user cluster, wherein the machine-learning model determines for each user of each user cluster, a probability distribution of sequences of locations to be visited by the user based on the sequences included in the user cluster;
   obtaining user data indicating a current location of a subsequent user;
   determining a user cluster of the plurality of user clusters to associate with the subsequent user based on the current location;
   determining a recommended sequence of locations to be provided to the subsequent user, wherein the recommended sequence of locations is determined by providing, to the machine-learning model, the user cluster associated with the subsequent user and the current location; and selecting, from the probability distribution of sequences of locations determined by the machine-learning model, a sequence of locations having a highest indicated probability of being visited by the subsequent user.

9. The system of claim 8, wherein the clustering comprises:

comparing a first location visited by a first user of the plurality of users and a second location visited by a second user of the plurality of users to determine a similarity between the first location and the second location; and grouping the first user and the second user to form a first user cluster based on the similarity.

10. The system of claim 8, wherein the processing device is further configured to provide, to the machine-learning model, a current location of the subsequent user, wherein the machine-learning model updates the probability distribution of sequences of locations based on the current location.

11. The system of claim 8, wherein the processing device is further configured to determine the probability distribution of sequences of locations comprises using a partially-observable Markov decision process (POMDP).

12. The system of claim 11, wherein the processing device is further configured to determine a trajectory associated with each user of the plurality of users, wherein the trajectory indicates an order of prior locations associated with the user, and wherein the clustering comprises grouping the plurality of users based at least in part on a similarity between trajectories associated with the plurality of users.

13. The system of claim 12, wherein the processing device is further configured to determine the recommended sequence of locations to be provided to the subsequent user.

14. The system of claim 8, wherein the processing device is further configured to output a recommended location of the recommended sequence of locations to the subsequent user.

15. A non-transitory computer-readable medium storing program code executable by a processor for learning user preferences for accurately predicting user behavior based on sequential user behavior data, the program code comprising:

program code for obtaining, by the processor, a plurality of sequences comprising prior locations visited by a corresponding user of a plurality of users;

program code for clustering, by the processor, the plurality of users into a plurality of user clusters, wherein each user cluster comprises a subset of the users and wherein each subset includes users having corresponding sequences that include at least one prior location in common;

program code for training, by the processor a machine-learning model to predict subsequent locations of users associated with each user cluster, wherein the machine-learning model determines, for each user of each user cluster, a probability distribution of sequences of locations to be visited by the user based on the sequences included in the user cluster;

program code for obtaining, by the processor, user data indicating a current location of a subsequent user;

program code for determining, by the processor, a user cluster of the plurality of user clusters to associate with the subsequent user based on the current location;

program code for determining, by the processor, a recommended sequence of locations to be provided to the subsequent user, wherein the recommended sequence of locations is determined by providing, to the machine-learning model, the user cluster associated with the subsequent user and the current location; and selecting, from the probability distribution of sequences of locations determined by the machine-learning model, a sequence of locations having a highest indicated probability of being visited by the subsequent user.

16. The non-transitory computer-readable medium of claim 15, wherein the clustering comprises:

comparing, by the processor, a first location visited by a first user of the plurality of users and a second location visited by a second user of the plurality of users to determine a similarity between the first location and the second location; and grouping, by the processor, the first user and the second user to form a first user cluster based on the similarity.

17. The non-transitory computer-readable medium of claim 15, wherein the program code further comprises program code for providing, to the machine-learning model, a current location of the subsequent user, wherein the machine-learning model updates the probability distribution of sequences of locations based on the current location.

18. The non-transitory computer-readable medium of claim 15, wherein the program code further comprises program code for determining, by the processor, the probability distribution of sequences of locations by using a partially-observable Markov decision process (POMDP).

19. The non-transitory computer-readable medium of claim 18, wherein the program code further comprises:

program code for determining, by the processor, a trajectory associated with each user of the plurality of users, wherein the trajectory indicates an order of prior locations associated with the user, and wherein the clustering further comprises grouping the plurality of users based at least in part on a similarity between trajectories associated with the plurality of users.

20. The non-transitory computer-readable medium of claim 15, wherein the program code further comprises:

program code for outputting, by the processor, a recommended location of the recommended sequence of locations to the subsequent user.

\* \* \* \* \*